United States Patent
Gilleo et al.

(10) Patent No.: US 7,658,436 B2
(45) Date of Patent: Feb. 9, 2010

(54) WEAKENING GROOVE WITH DIMPLE IN PULL CUP

(75) Inventors: Kevin Lyle Gilleo, Dexter, MI (US); Shuichi Ishimoto, Aichi-Ken (JP); Iwao Udatsu, Nagoya (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 528 days.

(21) Appl. No.: 11/624,896

(22) Filed: Jan. 19, 2007

(65) Prior Publication Data

US 2007/0214845 A1   Sep. 20, 2007

Related U.S. Application Data

(60) Provisional application No. 60/765,940, filed on Feb. 7, 2006.

(51) Int. Cl.
    *B60J 9/00*   (2006.01)
(52) U.S. Cl. .................................. 296/153; 296/1.09
(58) Field of Classification Search ............... 296/153, 296/152, 1.09, 187.03, 187.05; D12/421; 248/118
    See application file for complete search history.

(56) References Cited

U.S. PATENT DOCUMENTS 3,015,516 A * 1/1962 Clark ........................... 296/153
3,279,853 A * 10/1966 Cromwell et al. ...... 297/411.21
3,620,566 A * 11/1971 Leconte ...................... 296/153
4,373,665 A    2/1983 Dietzsch et al.
4,783,114 A   11/1988 Welch
5,046,777 A    9/1991 Garnweidner et al.
5,120,104 A *  6/1992 Grimes ........................ 296/153
5,158,353 A * 10/1992 Kimisawa .................... 362/501
5,181,759 A    1/1993 Doolittle
5,431,442 A    7/1995 Tomita et al.
5,433,478 A    7/1995 Naruse et al.
5,445,430 A    8/1995 Nichols
5,527,084 A    6/1996 Scherf
5,531,499 A    7/1996 Vecchio et al.
5,951,094 A *  9/1999 Konishi et al. .............. 296/153
6,863,335 B2   3/2005 Lopez Torres et al.
6,893,077 B1   5/2005 DeJongh
6,899,363 B2 * 5/2005 Dry ........................... 296/1.09
7,503,621 B2 * 3/2009 Mani ....................... 296/187.05

FOREIGN PATENT DOCUMENTS

DE           4140706         6/1993

* cited by examiner

*Primary Examiner*—H Gutman
(74) *Attorney, Agent, or Firm*—Gifford, Krass, Sprinkle, Anderson & Citkowski, P.C.

(57) ABSTRACT

A deformable vehicle door pull cup is provided which is both sufficiently strong for use during closing of the door and which also deforms during a side impact collision. A deformable vehicle door pull cup includes a weakening groove and dimple system in preferred embodiments. Dimples are placed within grooves to enhance crack propagation in a side impact collision.

19 Claims, 3 Drawing Sheets

WEAKENING GROOVE WITH DIMPLE IN PULL CUP

REFERENCE TO RELATED APPLICATION

This application claims priority of U.S. Provisional Patent Application Ser. No. 60/765,940, filed Feb. 7, 2006, the entire content of which is incorporated herein by reference.

FIELD OF THE INVENTION

The present invention relates generally to a door trim assembly for an automotive vehicle. More particularly, the present invention relates to a pull cup including one or more weakening grooves with dimples for promoting deformation of the pull cup to absorb energy of a side impact.

BACKGROUND OF THE INVENTION

Vehicle doors are frequently provided with an armrest having a pull cup for use in closing the door. Such a pull cup has a recess for permitting the fingers to grasp the pull cup while pulling the vehicle door shut. In order to perform this function, the pull cup must be sufficiently strong to withstand the forces produced by resistance of the mechanism holding the door open when being pulled during door closing. However, while the pull cup must be strong enough to withstand repetitive use over a number of years, it is disadvantageous to have a pull cup which is so rigid that it becomes dangerous to a vehicle occupant during a side impact collision. Thus, there is a continuing need for a deformable vehicle door pull cup which is both sufficiently strong for use during closing of the door and which also deforms during a side impact collision.

SUMMARY OF THE INVENTION

An impact absorbing pull cup is provided according to an embodiment of the present invention for use in conjunction with an automotive vehicle door. An inventive pull cup includes a wall defining a bottom wall and a side wall. In particular embodiments, the side wall extends generally transversely from the bottom wall at a junction formed by an intersection of the bottom wall and the side wall. In addition, the bottom wall and the side wall together define an internal cavity into which a user can insert a part of the hand in order to aid in closing the automotive vehicle door. The bottom wall and the side wall each have an exterior surface in which a plurality of grooves is formed. Each groove of the plurality of grooves has a groove depth extending a distance from the exterior surface of the side wall or the bottom wall to a groove base. The exterior surface of the side wall and/or bottom wall also includes a plurality of dimples formed in the plurality of grooves. Each of the plurality of dimples has a dimple depth which extends from the groove base to a dimple base.

A door trim panel assembly for an automotive vehicle is provided which includes an impact absorbing pull cup according to an embodiment of the present invention. Also included is a support wall for supporting an armrest and an armrest having an armrest wall. The armrest wall and the support wall together define an interior space for receiving an impact absorbing pull cup according to an embodiment of the present invention.

DETAILED DESCRIPTION OF THE INVENTION

Figure 1:
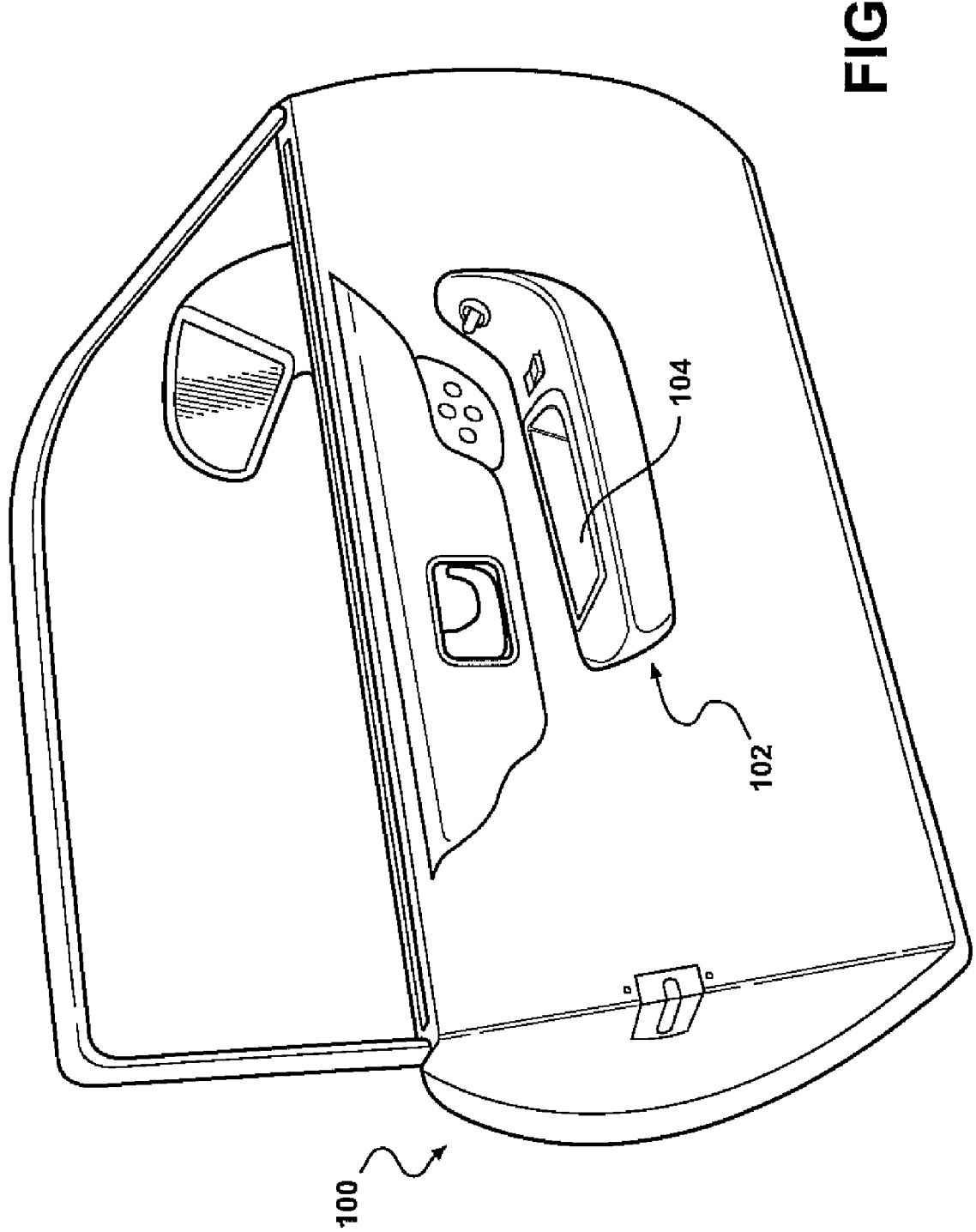
FIG. 1 is a drawing illustrating an interior side of a vehicle door including a deformable door pull cup.

An automotive door including a door trim panel assembly is generally indicated at 100 in FIG. 1. The door trim panel assembly includes an armrest 102 and a pull cup 104. Described in further detail below, the pull cup 104 includes a weakening groove and dimple structure to facilitate deformation in a side impact collision.

A pull cup is provided according to an embodiment of the present invention which has a wall and a coupling structure. The wall is characterized by a wall thickness and defines a bottom wall as well as a side wall. In a preferred embodiment, the side wall extends generally transversely from the bottom wall such that a junction is formed by an intersection of the bottom wall and the side wall.

The bottom wall and the side wall together define an internal cavity which has an interior surface and an exterior surface. The exterior surface of the internal cavity includes a plurality of weakening grooves and dimples formed in the exterior surface. Each groove of the plurality of grooves has a groove depth extending a distance from the exterior surface of the internal cavity to a groove base. Each dimple of the plurality of dimples has a dimple depth extending from the groove base to a dimple base.

Figure 2:
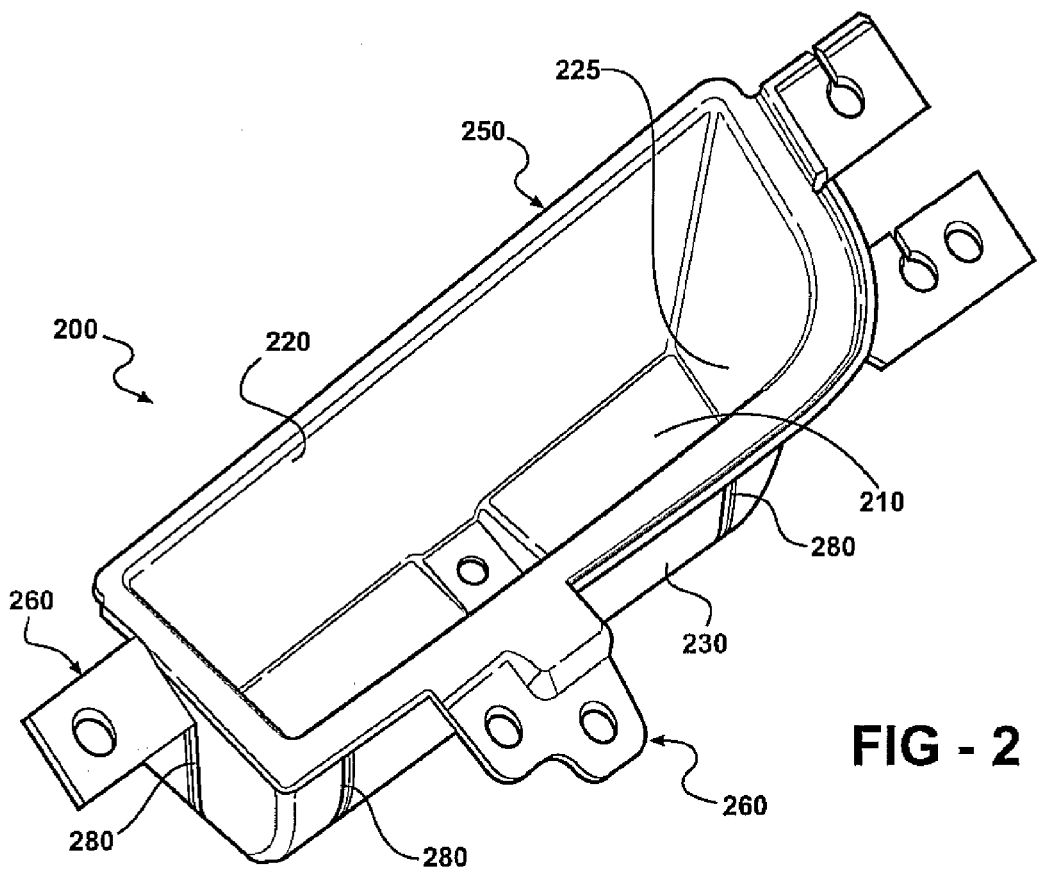
FIG. 2 is a drawing illustrating a top view of an embodiment of a deformable door pull cup according to the present invention.

FIG. 2 shows a top perspective view of an embodiment of an impact absorbing pull cup 200 having a wall defining a bottom wall 210 and a side wall 220. The bottom wall 210 and the side wall 220 define an internal cavity 225 for placement of a portion of an individual's hand while closing a vehicle door. The wall defining the internal cavity 225 has an exterior surface and an interior surface. In the embodiment illustrated in FIG. 2, the exterior surface of the side wall is shown at 230.

One or more coupling structures are included in an impact absorbing pull cup according to certain embodiments of the present invention for coupling the pull cup to one or more components of a vehicle door such as an armrest and/or a support wall. As illustrated in FIG. 2, a flange 250 is optionally included as a coupling structure for coupling interaction with a component of a vehicle door. Further shown in FIG. 2 are coupling structures in the form of bolt openings defined through bolt mounting flanges 260.

One or more weakening grooves are included in the exterior surface of the side wall and/or bottom wall of an inventive impact absorbing pull cup. As illustrated in FIG. 2, grooves 280 are formed in the exterior surface of the side wall in this embodiment.

Figure 3:
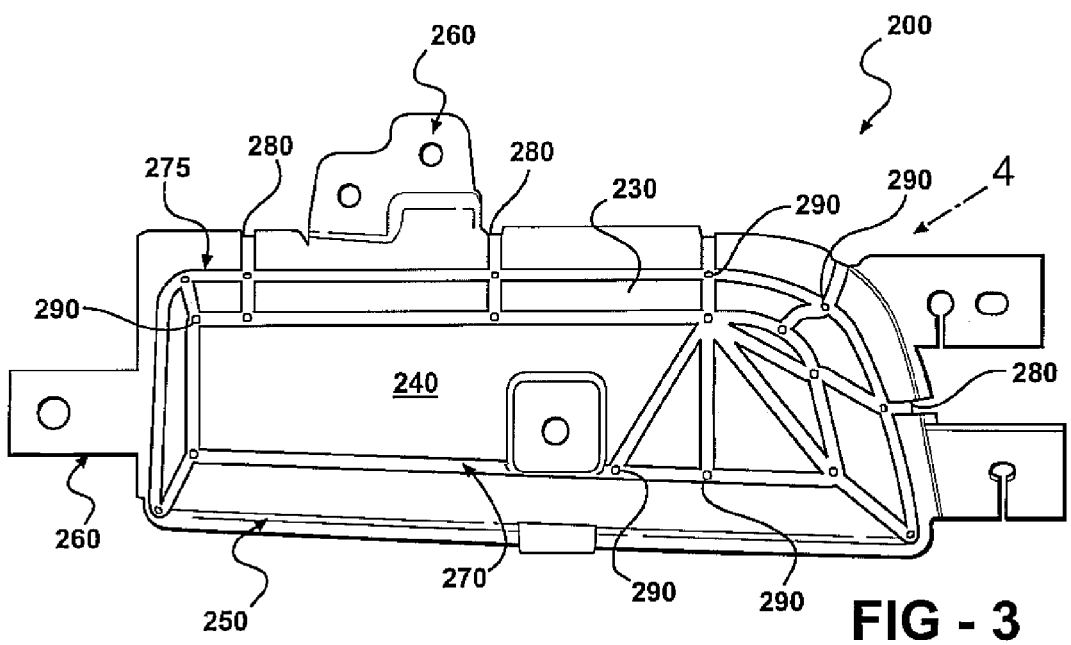
FIG. 3 is a drawing illustrating a bottom view of an embodiment of a deformable door pull cup having a groove and dimple system for a deformable pull cup according to the present invention.

FIG. 3 illustrates a bottom view of the impact absorbing pull cup of FIG. 2. In this view, a junction 270 between the exterior surface of the side wall 230 and the exterior surface of the bottom wall 240 is illustrated. Further, a junction 275 between the exterior surface of the side wall 230 and the flange 250 is shown.

A plurality of grooves 280 is present in the exterior surface of the side and bottom walls. Further, a plurality of dimples 290 is positioned in the grooves 280. In the specific embodiment shown, the dimples 290 are positioned in the grooves at the junction 270 of the exterior surface of the side wall 230 and the exterior surface of the bottom wall 240, as well as at the junction 275 of the exterior surface of the side wall 230 and the flange 250.

Also depicted in FIG. 3 is a plurality of coupling structures in the form of bolt openings defined through bolt mounting flanges 260.

Figure 4:
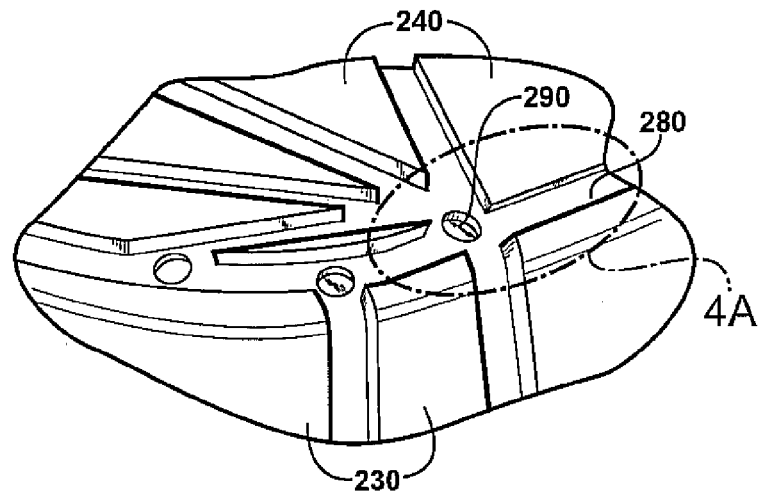
FIG. 4 is an enlarged view of a groove and dimple system in a wall of a deformable door pull cup.

FIG. 4 is an enlarged view of a region of a groove and dimple system in a wall of a deformable door pull cup as indicated in FIG. 3. The exterior surface of side wall 230 and the exterior surface of bottom wall 240 are illustrated, along with grooves 280 and dimples 290.

Figure 4A:
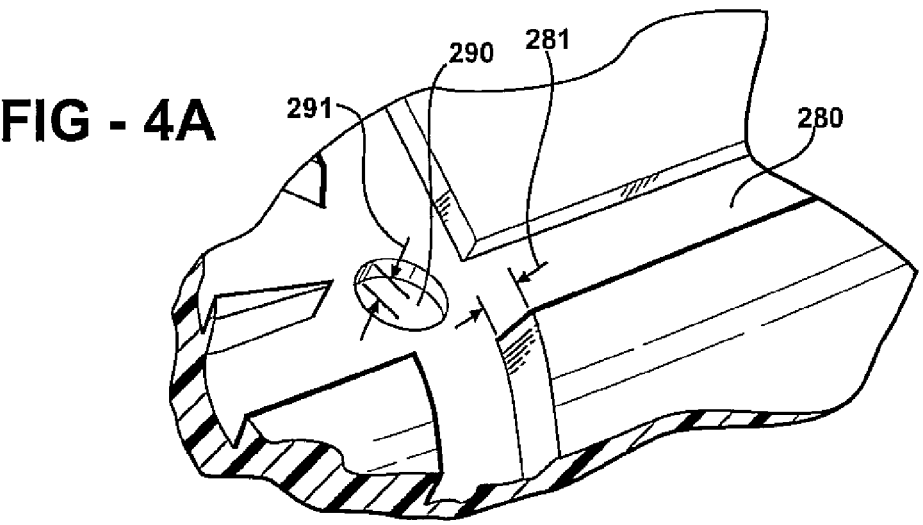
FIG. 4A is a further enlarged view of a groove and dimple system in a wall of a deformable door pull cup.

FIG. 4A is a further enlarged view of a groove and dimple system in a wall of a deformable door pull cup. In this view, a groove 280 is shown having a groove depth 281. A dimple 290 is also illustrated having a dimple depth 291.

Figure 5:
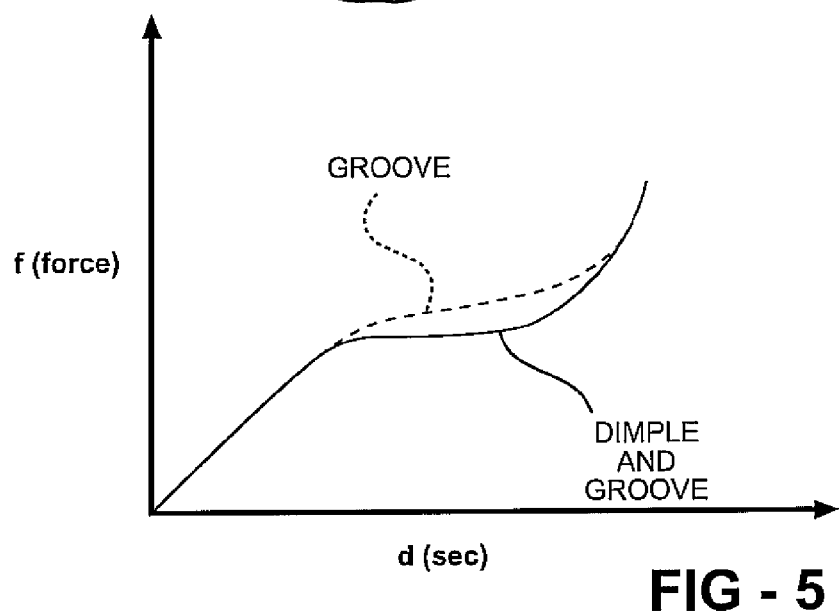
FIG. 5 is a graph showing crack propagation properties in relation to an applied force in a deformable pull cup having a groove and dimple weakening system according to the present invention in contrast to a pull cup structure having grooves only.

FIG. 5 is a graph showing an example of crack propagation properties in relation to an applied force in a deformable pull cup having a groove and dimple weakening system according to an embodiment of the present invention. The graph illustrates improved crack propagation in a deformable pull cup having a groove and dimple weakening system in contrast to a pull cup structure having grooves only. In particular, FIG. 5 shows that the amount of force to achieve crack propagation is reduced by using a dimple and groove weakening system according to the present invention.

In one embodiment of an inventive pull cup, at least some of the plurality of grooves extend generally transversely from the junction formed by the intersection of the bottom wall and the side wall. For example, FIG. 3 illustrates an embodiment in which at least some grooves 280 extend generally transversely from the junction 270 formed by the intersection of the bottom wall and the side wall. In certain preferred embodiments, at least some grooves 280 extend generally transversely from the junction 270 to the junction 275 at the intersection of the exterior surface of the side wall 230 and the flange 250. Optionally, at least some grooves 280 extend generally transversely from the junction 270 to the junction 275 at the intersection of the exterior surface of the side wall 230 and the flange 250, and further extend generally transversely from the junction 275 across at least a portion of the exterior surface of the flange 250.

In a further option, particular embodiments of an inventive pull cup include a groove in the exterior surface of the wall formed at the junction 270, wherein the groove generally follows the perimeter of the bottom wall 240. Similarly, an optional groove is formed at the junction 275, wherein the groove generally follows the junction 275.

In another embodiment, one or more grooves is formed in the exterior surface of the bottom wall. As illustrated in the embodiment shown in FIG. 3, one or more grooves 280 may be disposed in the exterior surface of the bottom wall 240 to further enhance weakening of the pull cup.

The groove depth is generally in the range of about 25-75 percent, inclusive, of the wall thickness. In further embodiments, the groove depth is in the range of about 45-55 percent, inclusive, of the wall thickness.

Dimples are disposed within grooves to further enhance advantageous crack propagation in a side impact collision. Dimples are generally located in locations such as corners from which crack propagation should occur. In particular embodiments, dimples are disposed within a groove at, or in proximity to, a junction of two or more walls. In further particular embodiments, dimples are disposed within a groove at, or in proximity to, a junction of a wall and a flange.

The dimple depth is in the range of about 10-35 percent, inclusive, of the wall thickness. In further embodiments, the dimple depth is in the range of about 15-25 percent, inclusive, of the wall thickness. In general, dimples have a diameter in the range of about 0.5-5 millimeters. In further preferred embodiments, dimples have a diameter in the range of about 1-3 millimeters. Further preferred is a dimple diameter of about 1.5-2 millimeters.

In a particular embodiment, a groove has a depth of approximately 50 percent of the wall thickness and has a width of approximately 2.5 millimeters, while a dimple has a depth of approximately 25 percent of the wall thickness such that groove and dimple depth together is approximately 75 percent of the wall thickness.

In one embodiment, an inventive pull cup is formed as a single molded piece. In further embodiments, components of the pull cup may be assembled to form the pull cup. A pull cup may be made from any of various materials, illustratively including a plastic such as a thermoset and/or thermoplastic polymer.

A door trim panel assembly for an automotive vehicle is provided according to the present invention which includes a support wall, an armrest supported by the support wall, and an impact absorbing pull cup. The armrest has an armrest wall such that the armrest wall and the support wall together define an interior space for receiving the impact absorbing pull cup.

Embodiments of inventive compositions and methods are illustrated in examples herein. These examples are provided for illustrative purposes and are not considered limitations on the scope of inventive compositions and methods.

The devices described herein are presently representative of preferred embodiments, exemplary, and not intended as limitations on the scope of any embodiment of an inventive pull cup. Changes therein and other uses will occur to those skilled in the art. Such changes and other uses can be made without departing from the scope of the invention as set forth in the claims.

We claim:

1. An impact absorbing pull cup for an automotive vehicle door, comprising:
   a wall having a wall thickness, said wall defining a bottom wall and a side wall, said side wall extending from said bottom wall at a junction formed by an intersection of said bottom wall and said side wall, said bottom wall and said side wall together defining an internal cavity having an interior surface and an exterior surface, said exterior surface having a plurality of grooves formed in said exterior surface, each groove of the plurality of grooves having a groove depth extending a distance from said exterior surface to a groove base, and said exterior surface having a plurality of dimples formed in said plurality of grooves, each of said plurality of dimples having a dimple depth extending from said groove base to a dimple base.

2. The impact absorbing pull cup for an automotive vehicle door of claim 1 wherein each dimple of said plurality of dimples is located at said junction formed by said intersection of said bottom wall and said side wall.

3. The impact absorbing pull cup for an automotive vehicle door of claim 1 wherein said side wall has a top edge and at least a portion of said plurality of grooves extend generally transversely from said junction formed by said intersection of said bottom wall and said side wall.

4. The impact absorbing pull cup for an automotive vehicle door of claim 1 wherein said groove depth is in the range of about 25-75 percent, inclusive, of said wall thickness.

5. The impact absorbing pull cup for an automotive vehicle door of claim 1 wherein said groove depth is in the range of about 45-55 percent, inclusive, of said wall thickness.

6. The impact absorbing pull cup for an automotive vehicle door of claim 1 wherein at least a portion of said plurality of dimples is disposed at said junction formed by said intersection of said bottom wall and said side wall.

7. The impact absorbing pull cup for an automotive vehicle door of claim 1 further comprising a flange extending from said side wall defining a junction between said flange and said side wall.

8. The impact absorbing pull cup for an automotive vehicle door of claim 7 wherein at least a portion of said plurality of dimples is disposed at said junction formed by said intersection of said flange and said side wall.

9. The impact absorbing pull cup for an automotive vehicle door of claim 1 wherein said dimple depth is in the range of about 10-35 percent, inclusive, of said wall thickness.

10. The impact absorbing pull cup for an automotive vehicle door of claim 1 wherein said dimple depth is in the range of about 15-25 percent, inclusive, of said wall thickness.

11. The impact absorbing pull cup for an automotive vehicle door of claim 1, further comprising a coupling structure.

12. A door trim panel assembly for an automotive vehicle, said door trim panel assembly having a support wall for supporting an armrest, the armrest having an armrest wall, said armrest wall and said support wall together defining an interior space, the door trim panel assembly for automotive vehicle comprising:
an impact absorbing pull cup disposed in the interior space, the impact absorbing pull cup having a wall, said wall having a wall thickness and a coupling structure, said wall defining a bottom wall and a side wall, said side wall extending from said bottom wall at a junction formed by an intersection of said bottom wall and said side wall, said bottom wall and said side wall together defining an internal cavity having an interior surface and an exterior surface, said exterior surface having a plurality of grooves formed in said exterior surface, each groove of the plurality of grooves having a groove depth extending a distance from said exterior surface to a groove base, and said exterior surface having a plurality of dimples formed in said plurality of grooves, each of said plurality of dimples having a dimple depth extending from said groove base to a dimple base.

13. The door trim panel assembly for an automotive vehicle of claim 12 wherein said side wall has a top edge and at least a portion of said plurality of grooves extend generally transversely from said junction formed by said intersection of said bottom wall and said side wall.

14. The door trim panel assembly for an automotive vehicle of claim 12 wherein said groove depth is in the range of about 25-75 percent, inclusive, of said wall thickness.

15. The door trim panel assembly for an automotive vehicle of claim 12 wherein at least a portion of said plurality of dimples is disposed at said junction formed by said intersection of said bottom wall and said side wall.

16. The door trim panel assembly for an automotive vehicle of claim 12 further comprising a flange extending from said side wall defining a junction between said flange and said side wall.

17. The door trim panel assembly for an automotive vehicle of claim 16 wherein at least a portion of said plurality of dimples is disposed at said junction formed by said intersection of said flange and said side wall.

18. The door trim panel assembly for an automotive vehicle of claim 12 wherein said dimple depth is in the range of about 10-35 percent, inclusive, of said wall thickness.

19. The door trim panel assembly for an automotive vehicle of claim 12 wherein said dimple depth is in the range of about 15-25 percent, inclusive, of said wall thickness.

* * * * *

UNITED STATES PATENT AND TRADEMARK OFFICE
CERTIFICATE OF CORRECTION

PATENT NO. : 7,658,436 B2  Page 1 of 1
APPLICATION NO. : 11/624896
DATED : February 9, 2010
INVENTOR(S) : Gilleo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Thirtieth Day of November, 2010

David J. Kappos
*Director of the United States Patent and Trademark Office*